US010210032B2

(12) United States Patent
Ramalingam

(10) Patent No.: US 10,210,032 B2
(45) Date of Patent: Feb. 19, 2019

(54) PROCESSING COMMANDS VIA DEDICATED REGISTER PAIRS FOR EACH THREAD OF A PLURALITY OF THREADS

(71) Applicant: INTEL CORPORATION, Santa Clara, CA (US)

(72) Inventor: Anand S. Ramalingam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 139 days.

(21) Appl. No.: 15/475,017

(22) Filed: Mar. 30, 2017

(65) Prior Publication Data
US 2018/0285155 A1 Oct. 4, 2018

(51) Int. Cl.
*G06F 11/07* (2006.01)
*G06F 9/30* (2018.01)

(52) U.S. Cl.
CPC ...... *G06F 11/0736* (2013.01); *G06F 9/30101* (2013.01); *G06F 11/0757* (2013.01); *G06F 11/0772* (2013.01)

(58) Field of Classification Search
CPC ............ G06F 9/30101; G06F 11/0736; G06F 11/0757; G06F 11/0772
USPC .............................................. 714/10, 30, 31
See application file for complete search history.

(56) References Cited

U.S. PATENT DOCUMENTS 8,359,459 B2 * 1/2013 Gove .................. G06F 9/52
712/220
2014/0189332 A1 * 7/2014 Ben-Kiki ............ G06F 9/30145
712/244

* cited by examiner

*Primary Examiner* — Joseph R Kudirka
(74) *Attorney, Agent, or Firm* — Konrad Raynes Davda & Victor LLP; Rabindranath Dutta

(57) ABSTRACT

A hardware acceleration block is configured to process via a dedicated pair of registers, a plurality of commands of each of a plurality of threads received from a compute complex. The hardware acceleration block receives successive commands that are separated by at least an amount of time, from a thread of the plurality of threads. The amount of time is adequate to process a command from the thread.

25 Claims, 6 Drawing Sheets

PROCESSING COMMANDS VIA DEDICATED REGISTER PAIRS FOR EACH THREAD OF A PLURALITY OF THREADS

BACKGROUND

An embedded system may comprise a unit included within a larger system, where the larger system may be a computational system, a mechanical system, an electrical system, etc. In many situations, the embedded system many perform dedicated functions within the larger system. The embedded system may be a part of a device and may be dedicated to perform a specific task faster than other units of the larger system.

Certain embedded systems may include a hardware acceleration block and one or more cores that interface with the hardware acceleration block. The hardware acceleration block may be designed to perform dedicated functions by interfacing with the one or more cores. Many operations, such as encryption, decryption, compression, decompression, encoding, decoding, error correction, etc., may require significant processor cycles or significant resources to complete. Such operations may be offloaded to the hardware acceleration block for execution.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide an embedded system in which a hardware acceleration block provides a pair of registers comprising a completion register and a submission register for each thread of a plurality of threads that are sent for execution by the hardware acceleration block. A command from a thread is placed in the submission register, and the result of executing the command in the embedded system is read from the completion register. The thread sends successive commands that are separated by a predetermined amount of time, where the predetermined amount of time is adequate to process a command in the hardware acceleration block.

The hardware acceleration block may generate an interrupt indicating a fault if a new command from a thread is received prior to completion of a previous command of the thread. In certain alternative embodiments, the hardware acceleration block may indicate in a response to the thread that a fault comprising a timing violation occurred because a new command from a thread was received prior to completion of a previous command of the thread. As a result, in comparison to mechanisms in which a single pair of registers comprising a completion register and a submission register are provided for a plurality of threads, certain embodiments reduce the processing overhead of managing the plurality of threads. For example, in mechanisms in which a pair of registers comprising a completion register and a submission register are provided, the processing overhead may comprise the processing time and resources needed for thread synchronization of a plurality of threads to access the pair of registers comprising the completion register and the submission register that are shared by the plurality of threads, and this processing overhead for thread synchronization is eliminated by providing a completion register and a submission register for each thread of a plurality of threads. Certain embodiments also avoid the time associated with determining the state of the hardware acceleration block prior to accessing the completion and submission registers.

Figure 1:
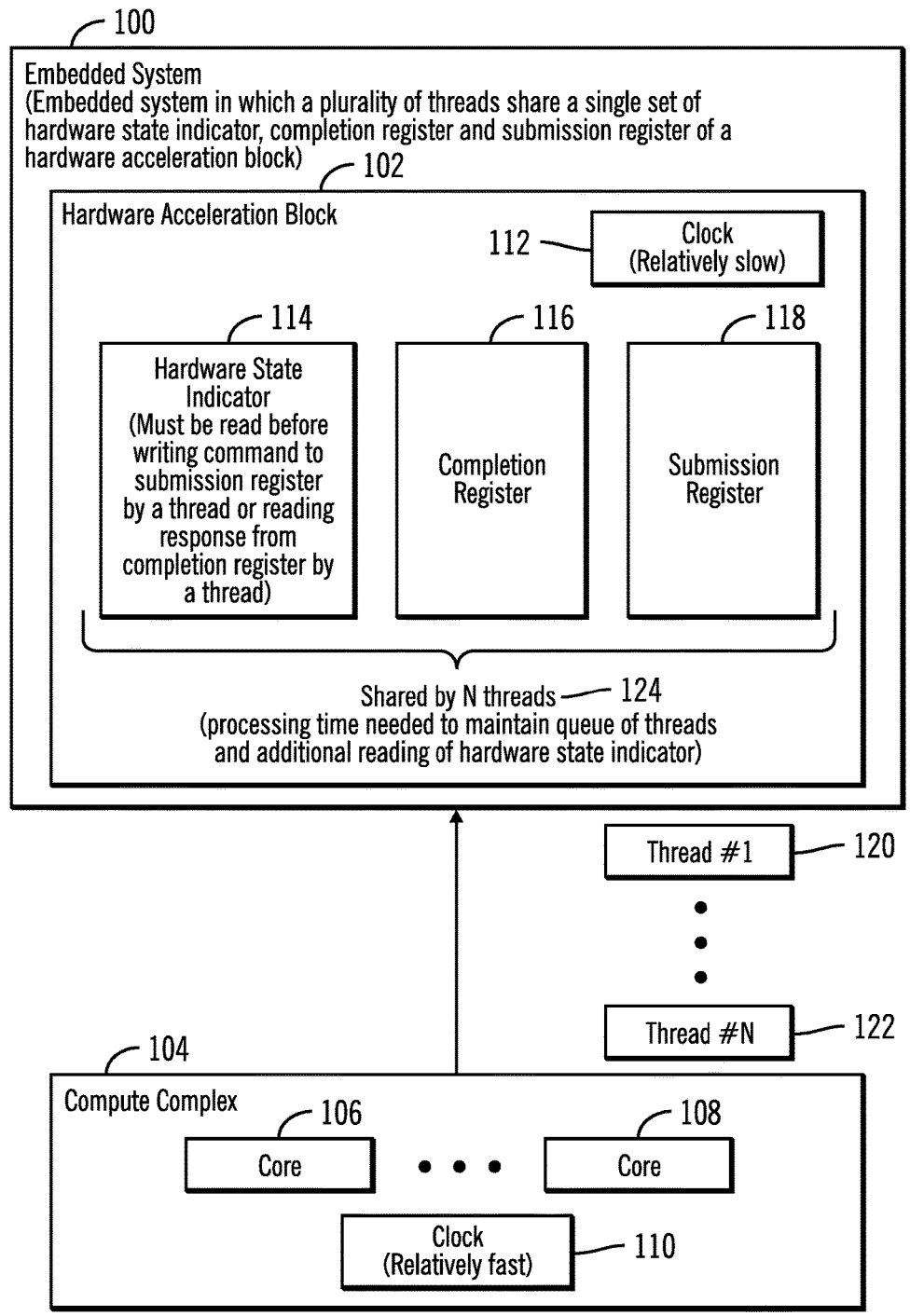
FIG. 1 illustrates a block diagram that shows an embedded system in which a plurality of threads share a single set of registers comprised of a hardware state indicator, a completion register and a submission register of a hardware acceleration block, in accordance with certain embodiments.

FIG. 1 illustrates a block diagram that shows an embedded system 100 in which a plurality of threads share a single set of registers comprising a hardware state indicator, a completion register and a submission register of a hardware acceleration block, in accordance with certain embodiments.

The embedded system 100 is comprised of a hardware acceleration block 102 and a compute complex 104. The hardware acceleration block 102 may be implemented via circuitry including an application specific integrated circuit (ASIC) that may be used to perform dedicated functions. The compute complex 104 may be comprised of one or more cores 106, 108 (e.g., processor cores) and may include hardware, firmware, software or any combination thereof. The clock 110 driving the compute complex 104 may be relatively fast in comparison to the clock 112 driving the hardware acceleration block 102, and as a result reads and writes with respect to the registers of the hardware acceleration block 102 may be relatively time consuming in comparison to reads and writes performed from registers of the compute complex 104.

The hardware acceleration block 102 is comprised of a hardware state indicator 114, a completion register 116, and a submission register 118. The compute complex 104 generates a plurality of threads that are transmitted for execution to the hardware acceleration block 102, where a thread may comprise a sequence of commands. In FIG. 1, N threads are shown via reference numerals 120, 122. A thread of the plurality of threads has to acquire a lock (the lock is commonly referred to as MUTEX, which is an acronym for mutual exclusion) to access the single pair of shared completion and submission registers 116, 118. Additionally, before a thread writes a command to the submission register 118, the thread must read the hardware state indicator 114 to determine whether the hardware acceleration block 102 is still busy processing a previous command from the same thread or from a different thread. Only if the hardware state indicator 114 indicates that the hardware acceleration block 102 is not busy can the thread write the command to the submission register 118, or else the embedded system 100 may not operate properly.

After a command is written to the submission register 118, the hardware acceleration block 102 processes the command and writes the result in the completion register 116, for the thread to read. Before the thread reads the completion register 116, the thread must read the hardware state indicator 114 to determine whether the hardware acceleration block 102 is still busy processing a previous command from the same thread or from a different thread. Only if the hardware state indicator 114 indicates that the hardware acceleration block 102 is not busy can the thread read the result from the completion register 116. Since the clock 112 of the hardware acceleration block 102 is relatively slow, the overhead of reading the hardware state register 114 prior to accessing the completion register 116 and the submission register 118 increases the time needed for a thread to complete the operations of the thread, relative to the compute complex 104.

Additionally, a single set of hardware state indicator 114, completion register 116, and submission register 118 is shared by the N threads 120, 122 (as shown via reference numeral 124). As a result, the management of the threads that run concurrently may require preserving mutual exclusion conditions and performing other checks, and additional processing time is needed to perform such operations.

Figure 2:
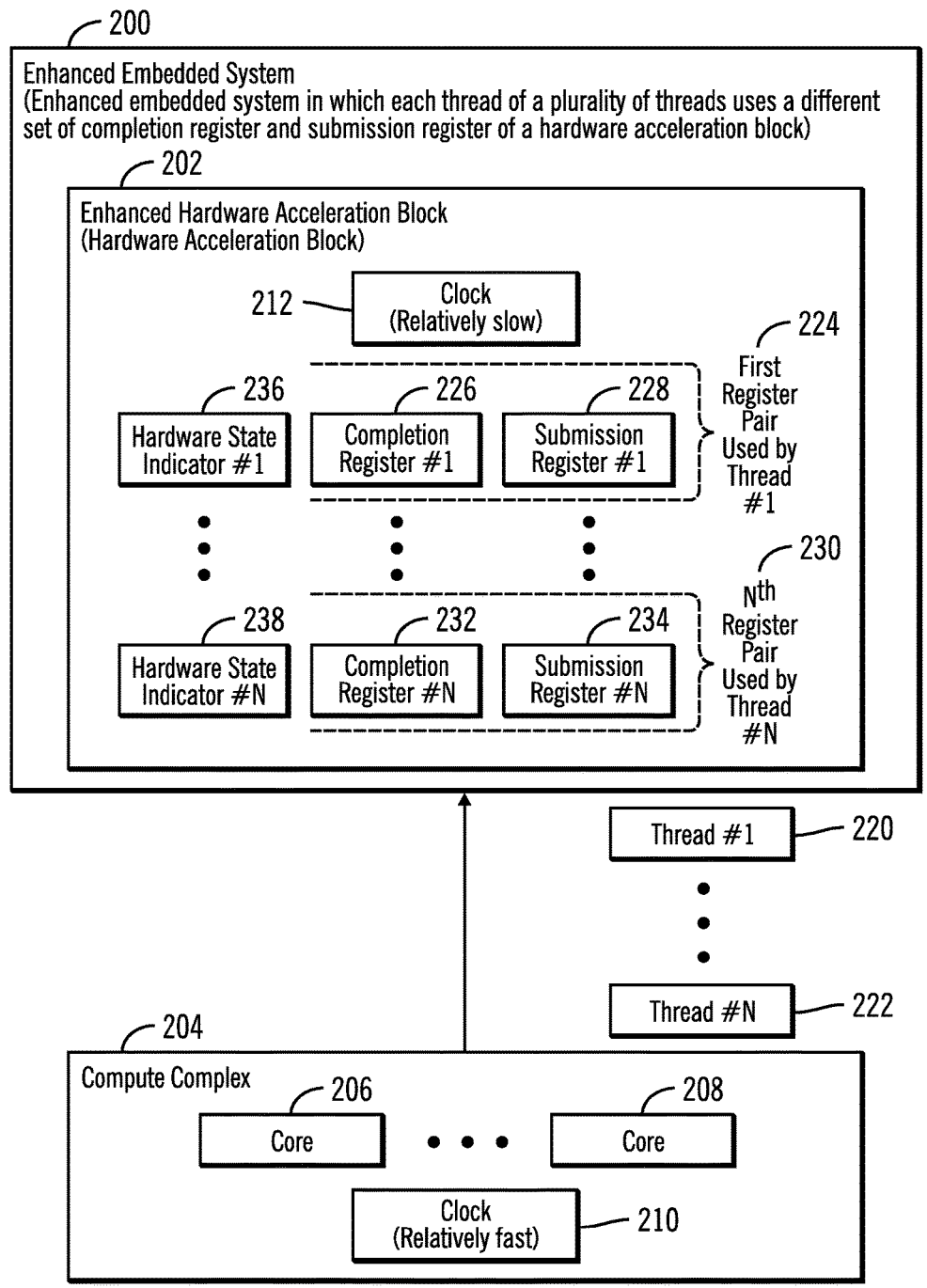
FIG. 2 illustrates a block diagram that shows an enhanced embedded system in which each thread of a plurality of threads use a different set of registers comprised of a completion register and a submission register of an enhanced hardware acceleration block, in accordance with certain embodiments.

FIG. 2 illustrates a block diagram that shows an enhanced embedded system 200 in which each thread of a plurality of threads use a different set of registers comprising a completion register and a submission register of a hardware acceleration block, in accordance with certain embodiments.

The enhanced embedded system 200 is comprised of an enhanced hardware acceleration block 202 and a compute complex 204. The enhanced hardware acceleration block 202 may be implemented via circuitry including an ASIC that may be used to perform dedicated functions. The compute complex 204 may be comprised of one or more cores 206, 208 (e.g., processor cores) and may include hardware, firmware, software or any combination thereof. The clock 210 driving the compute complex 204 may be relatively fast in comparison to the clock 212 driving the enhanced hardware acceleration block 202 and as a result reads and writes with respect to the registers of the enhanced hardware acceleration block 202 may be relatively time consuming in comparison to reads and writes performed with respect to the registers of the compute complex 204. As a result of the enhanced hardware acceleration block 202 being on a slower clock domain than the clock domain of the compute complex 204, and also because reads and writes to the registers of the enhanced hardware acceleration block 202 take several clock cycles of the compute complex 204, in certain situations there may be as much as a 40 times clock cycle penalty to read or write to the registers of the enhanced hardware acceleration block 202. Hence each read from a register of the enhanced hardware acceleration block 202 may result in considerable penalty for the compute complex 204.

In FIG. 2, the compute complex 204 generates a plurality of threads that are transmitted for execution to the enhanced hardware acceleration block 202, where a thread may comprise a sequence of commands. In FIG. 2, N threads are shown via reference numerals 220, 222.

In FIG. 2, for the processing of each thread, a pair of registers are assigned. For example, for processing thread #1 220, a first register pair 224 comprising a completion register #1 226 and a submission register #1 228 is assigned. Similarly, for processing thread #N 222, an $N^{th}$ register pair 230 comprising a completion register #N 232 and a submission register #N 234 is assigned.

The enhanced hardware acceleration block 202 also has hardware state indicators associated with each register pair, where the hardware state indicators are not accessed by the threads 220, 222. For example, the hardware state indicator #1 236 is associated with the first register pair 224, and the hardware state indicator #N 238 is associated with the $N^{th}$ register pair 230.

Therefore, the enhanced hardware acceleration block 202 (also referred to as hardware acceleration block) has a plurality of register pairs 224, 230 corresponding to a plurality of threads 220, 222. As a result, unlike the embodiments shown in FIG. 1, there is no need for additional processing time to preserve mutual exclusion conditions and perform other checks for the concurrently running threads 220, 222.

In FIG. 2, each thread writes a command to the submission register corresponding to the thread and then writes the next command only after the expiry of at least a predetermined amount of time needed by the enhanced hardware acceleration block 202 to complete the processing of the command. The thread may read the result of the command, where the result is placed in the completion register corresponding to the thread by the enhanced hardware acceleration block 202. The hardware state indicator associated with the thread does not have to be checked by the thread because a next command from the thread is sent only after the expiry of at least a predetermined amount of time needed by the hardware acceleration block 202 to complete the processing of the previous command from the thread. In certain embodiments in which the enhanced embedded system 200 is implemented in an ASIC, the software that implements a thread has information on the minimum wait time needed before submission of a next command via the thread. Since each thread has a dedicated pair of submission and completion registers, the software may perform other computations for at least the predetermined amount of time.

However, in case the hardware state indicator is busy when the thread attempts to access the register pair corresponding to the thread, then the hardware acceleration block 202 generates an interrupt to indicate a fault that indicates a timing violation. Such a situation may occur, if the predetermined amount of time is not adequate for completing the previous command prior to the arrival of the new command. For example, the timing violation may occur because the software implemented thread may have several different paths or options on what operations to perform while the enhanced hardware acceleration block 202 is performing operations. One or more of the paths may cause an underrun (i.e., data is not generated within the predetermined amount of time to complete the previous command prior to the arrival of the new command). Usually, an infrequently invoked path may have such problems and when uncovered during validation or testing, such problems may be fixed. Until such problems are fixed the timing violations may continue to occur. In other embodiments, instead of generating an interrupt, the enhanced hardware acceleration block 202 may indicate in a response to the thread that a timing violation occurred during processing.

Therefore, in the enhanced hardware acceleration block 202, before an exemplary thread writes a command to the submission register corresponding to the thread or reads the completion register corresponding to the thread, the thread does not read the hardware state indicator to determine whether the enhanced hardware acceleration block 202 is still busy processing a previous command. As a result, the processing overhead of reading the hardware state indicator is eliminated in comparison to the embodiments shown in FIG. 1.

Therefore, the enhanced hardware acceleration block 202 shown in FIG. 2 processes threads must faster in comparison to the hardware acceleration block 102 shown in FIG. 1.

Figure 3:
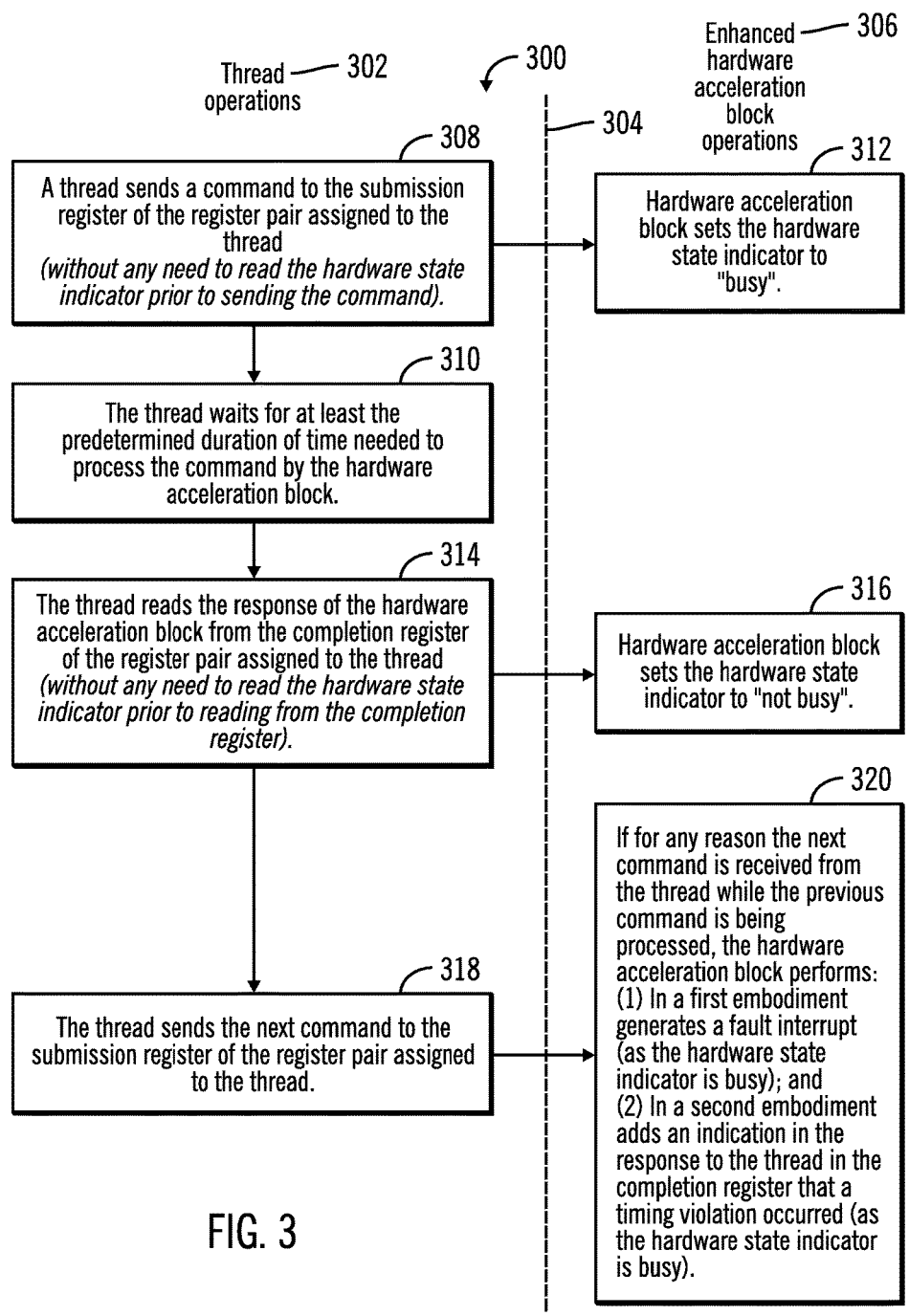
FIG. 3 illustrates a flowchart that shows operations performed by a thread and operations performed by the enhanced hardware acceleration block of the enhanced embedded system, in accordance with certain embodiments.

FIG. 3 illustrates a flowchart 300 that shows operations performed by a thread and operations performed by the enhanced hardware acceleration block 202 of the enhanced embedded system 200, in accordance with certain embodiments. The thread operations 302 are shown to the left of the dashed line 304, and the enhanced hardware acceleration block operations 306 are shown to the right of the dashed line 304.

Control starts at block 308 in which a thread 220 sends a command to the submission register 228 of the register pair 224 assigned to the thread 220. There is no need for the thread 220 to read the hardware state indicator 236 prior to sending the command to the submission register 228.

From block 308, control proceeds to block 310 in which the thread 220 waits for at least a predetermined duration of time that is needed to process the command by the hardware acceleration block 202. For example, in certain embodiments the predetermined duration of time may be set to be "X" nanoseconds for the thread 220, and in such embodiments successive commands of the thread 220 to the submission register 228 are sent separated by a time that is "X" nanoseconds of more.

From block 308, control also proceeds to block 312 in which the enhanced hardware acceleration block 202 sets the hardware state indicator 236 to be "busy" because the enhanced hardware acceleration block 202 is processing the command sent by the thread.

From block 310 control proceeds to block 314 in which the thread 220 reads the response of the enhanced hardware acceleration block 202 from the completion register 226 of the register pair 224 assigned to the thread 220. There is no need to read the hardware state indicator 236, prior to reading from the completion register 226 as the predetermined duration of time needed to process the command has elapsed prior to the performing of operations shown in block 314. It should be noted that each thread "owns" (i.e. is assigned) a pair of submission and completion registers. The timing contract for each thread is such that even under a worst case, the hardware acceleration block 202 is able to complete the requests made via commands from the thread. For example, in certain embodiments the enhanced hardware acceleration block 202 may take 1 microsecond to process one request, and in a worst case scenario there may be 3 such simultaneous requests (timings in the worst case scenario are known a priori in an embedded system). Each thread has a "timing contract" of 3 microseconds, i.e. the thread will not read the completion register prior to an elapse of 3 microseconds. As a result, the thread never has to check whether the enhanced hardware acceleration block 202 is busy by checking the hardware state indicator. However, the thread has to ensure is that it does not submit a second command within the 3 microsecond contract window. As a consequence of the sequential nature of control flow in a thread, the thread ensures that it reads the completion register no sooner than 3 microseconds and by design should never submit a second command within the same time window.

From block 314 control proceeds to block 316 in which the enhanced hardware acceleration block 202 sets the hardware state indicator 236 to "not busy" because the enhanced hardware acceleration block 202 is no longer processing the command sent by the thread.

From block 314 control also proceeds to block 318 in which the thread 220 sends the next command to the submission register 228 of the register pair 224 assigned to the thread 220.

If for any reason (e.g., the predetermined duration of time needed to process the command was inadequate, i.e., a timing violation occurred) the next command is received from the thread 220 while the previous command from the thread 220 is being processed, the enhanced hardware acceleration block 202 in one embodiment generates (at block 320) a fault interrupt (as the hardware state indicator 236 is indicated as "busy" while the previous command is being processed), whereas in another embodiment the enhanced hardware indicator block 202 adds (at block 320) an indication in the response made to the thread in the completion register 226 that a timing violation occurred (as the hardware state indicator 236 is indicated as "busy" while the previous command is being processed). The fault interrupt may be generated in a real-time embedded system whereas the indication in the response in the completion register may be added in an embedded system that does not operate in real-time.

Therefore, FIG. 3 illustrates certain embodiments in which the enhanced hardware acceleration block 202 (shown in FIG. 2) performs the processing of threads faster in comparison to the processing of threads in the hardware acceleration block 102 (shown in FIG. 1), by assigning different register pairs (e.g., register pairs 224, 230) for each thread, to eliminate the overhead of managing mutual exclusion conditions, etc., and also by avoiding the overhead of reading a hardware state indicator by a thread. Not only does a thread send a next command after the elapse of a predetermined duration of time needed to process the previous command, but also as an additional safeguard, the enhanced hardware acceleration block 202 generates an interrupt indicating a fault corresponding to a timing violation or provides an indication of a timing violation in a response to the thread, in situations in which the predetermined duration of time is not adequate. It should be noted that while the operations shown in FIG. 4 have been described with respect to thread #1 220, any of the other threads in the set of N threads 220, 222 may perform equivalent operations.

Figure 4:
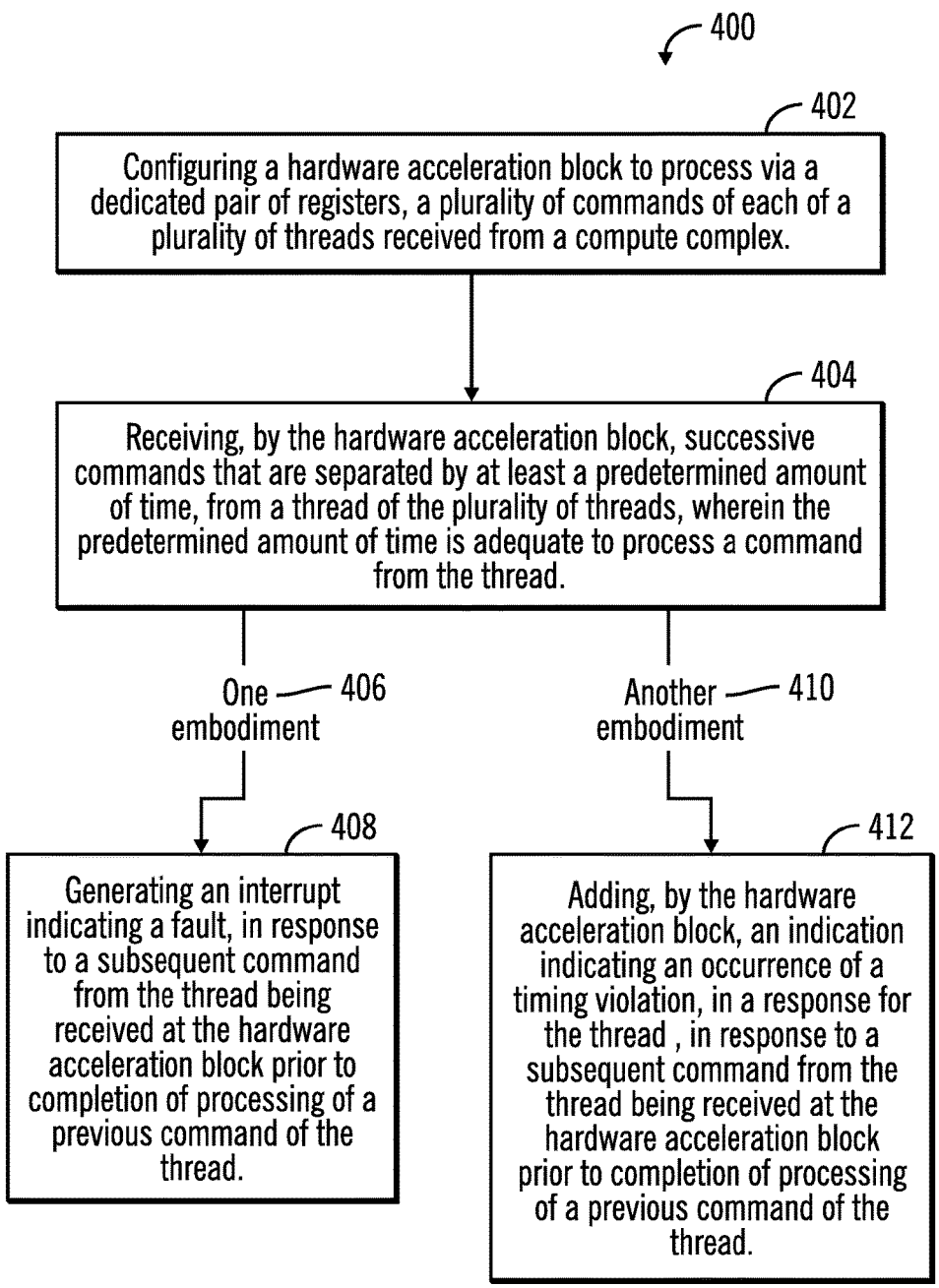
FIG. 4 illustrates a flowchart that that shows operations performed in an enhanced hardware acceleration block of the enhanced embedded system, in accordance with certain embodiments.

FIG. 4 illustrates a flowchart 400 that that shows operations performed in the enhanced hardware acceleration block 202 of the enhanced embedded system 200, in accordance with certain embodiments.

Control starts at block 402 in which a hardware acceleration block 202 is configured to process via a dedicated pair of registers (e.g., 224, 230), a plurality of commands of each of a plurality of threads 220, 222 received from a compute complex 204. The hardware acceleration block 202 receives (at block 404) successive commands that are separated by at least a predetermined amount of time, from a thread (e.g., thread 220) of the plurality of threads 220, 222, where the predetermined amount of time is adequate to process a command from the thread (e.g., thread 220).

In one embodiment (shown via branch 406), the hardware acceleration block 202 generates (at block 408) an interrupt that indicates a fault, in response to a subsequent command from the thread 220 being received at the hardware acceleration block 202 prior to completion of processing of a previous command of the thread 220.

In another embodiment (shown via branch 410) the hardware acceleration block 202 adds (at block 412) an indication indicating a timing violation, in a response for the thread 220, in response to a subsequent command from the thread 220 being received at the hardware acceleration block 202 prior to completion of processing of a previous command of the thread 220.

In certain embodiments, the dedicated pair of registers comprise a submission register and a completion register. A first command is received from the thread at the submission register and a state indicator is set to indicate a busy state by the hardware acceleration block 202. The first command is processed and a response is indicated by the hardware acceleration block 202 in the completion register for the thread to read. In response to a reading of the completion register, the state indicator is indicated to be in a not busy state by the hardware acceleration block 202.

Therefore, FIG. 2-4 illustrate certain embodiments in which the plurality of threads 220 222 avoid reading the hardware state indicators 236, 238, and the compute complex 204 avoids operations to maintain any queues of the plurality of threads 220 to access the hardware acceleration block 202. A thread waits or performs other operations at least for a predetermined amount of time between sending successive commands to the hardware acceleration block 202, where the predetermined amount of time is adequate to process a command. In should be noted that instead of waiting during the predetermined amount of time, the thread may interleave other useful processing that consumes at least the predetermined amount of time. This provides superior utilization for the compute complex 204 in the enhanced embedded system 200.

Figure 5:
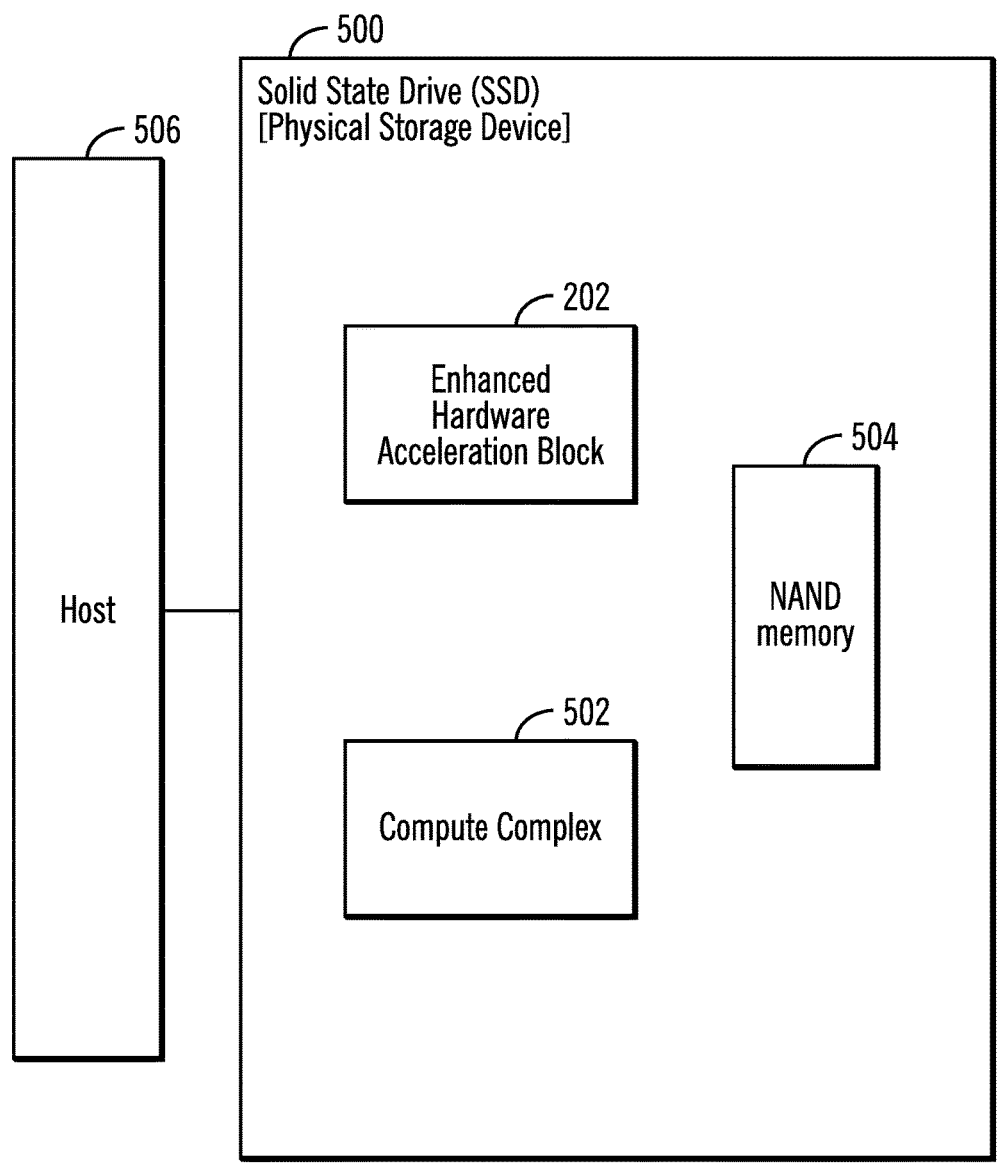
FIG. 5 illustrates a block diagram of a solid state drive that includes the enhanced hardware acceleration block and a compute complex, in accordance with certain embodiments.

FIG. 5 illustrates a block diagram of a solid state drive 500 that includes the enhanced hardware acceleration block 202 (shown in FIG. 2) and a compute complex 502, in accordance with certain embodiments.

The solid state drive 500 may include memory 504 that is accessed by a host 506 that is coupled to the solid state drive 500. In certain embodiments, the enhanced hardware acceleration block 202 performs read, write, and error correction operations, etc., on memory 504 of the solid state drive 500.

The host 506 may comprise any suitable computational device including those presently known in the art, such as, a personal computer, a workstation, a server, a mainframe, a hand held computer, a palm top computer, a telephony device, a network appliance, a blade computer, a processing device, an automobile based computer system, etc.

In certain embodiments, the enhanced hardware acceleration block 202 may be included in other devices, such as a physical storage device that is a block addressable memory device, such as those based on NAND or NOR technologies. A physical storage device may also include future generation nonvolatile devices, such as a three dimensional (3D) cross-point memory device, or other byte and/or block addressable write-in-place nonvolatile memory devices. In one embodiment, the physical storage device may be or may include memory devices that use chalcogenide glass, multi-threshold level NAND flash memory, NOR flash memory, single or multi-level phase change memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, a spintronic magnetic junction memory based device, or a combination of any of the above, or other memory. The physical storage device may refer to the die itself and/or to a packaged memory product. Certain embodiments may be more suitable when an "operations/sec" performance metric is over a 100,000 range, and PCM based storage typically fall in this range and so do many or all of the other next generation memory described above. NAND based memory may also fall in the same range, but in certain embodiments may need at least 1 Terabytes of storage to have enough parallelism to deliver performance that reaches over 100,000 operations/sec.

The described components and/or operations may be implemented as a method, apparatus or computer program product using standard programming and/or engineering techniques to produce software, firmware, hardware, or any combination thereof. The described operations may be implemented as code maintained in a "computer readable storage medium" for implementation in certain embodiments or for software simulation of a memory chip for design purposes, where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard drive drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), solid state devices (SSD), etc. The code implementing the described operations may further be implemented in hardware logic implemented in a hardware device (e.g., an integrated circuit chip, programmable gate array (PGA), ASIC, etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of flowcharts and/or block diagrams may be implemented by computer program instructions.

Figure 6:
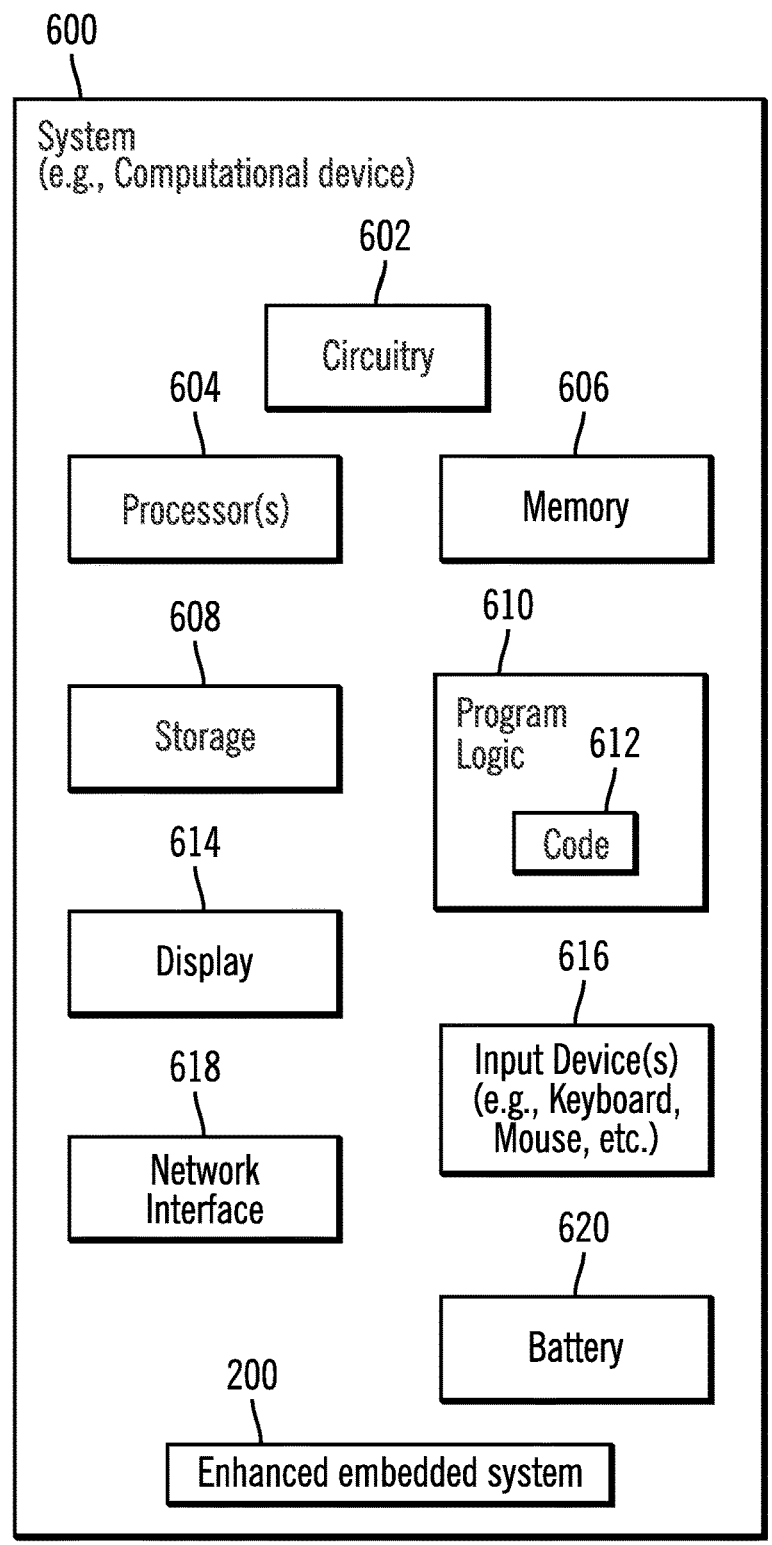
FIG. 6 illustrates a block diagram of a system that includes the enhanced embedded system, in accordance with certain embodiments.

FIG. 6 illustrates a block diagram of a system 600 that may include a computational device that includes the enhanced embedded system 200. For example, in certain embodiments the system 600 may be a computer (e.g., a laptop computer, a desktop computer, a tablet, a cell phone or any other suitable computational device) that has a storage or memory device in the computer. The system 600 may include a circuitry 602 that may in certain embodiments include at least a processor 604. The system 600 may also include a memory 606, and storage 608. The storage 608 may include a solid state drive, a disk drive, or other drives or devices including a non-volatile memory device (e.g., EEPROM, ROM, PROM, flash, firmware, programmable logic, etc.). The storage 608 may also include a magnetic disk drive, an optical disk drive, a tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602. The system 600 may also include a display 614 (e.g., an liquid crystal display (LCD), a light emitting diode (LED) display, a cathode ray tube (CRT) display, a touchscreen display, or any other suitable display). The system 600 may also include one or more input devices 616, such as, a keyboard, a mouse, a joystick, a trackpad, or any other suitable input devices. In certain embodiments, the display 614 may be coupled to a memory or storage device comprising the storage 608 and/or the memory 606; a network interface 618 may be communicatively coupled to the processor 604; and a battery 620 may be communicatively coupled to the processor 604. Other components or devices beyond those shown in FIG. 6 may also be found in the system 600.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiments.

Example 1 is a method method for command processing, in which a hardware acceleration block is configured to process via a dedicated pair of registers, a plurality of commands of each of a plurality of threads received from a compute complex. The hardware acceleration block receives successive commands that are separated by at least an amount of time, from a thread of the plurality of threads, wherein the amount of time is adequate to process a command from the thread.

In example 2, the subject matter of example 1 may include generating an interrupt indicating a fault, in response to a subsequent command from the thread being received at the hardware acceleration block prior to completion of processing of a previous command of the thread.

In example 3, the subject matter of example 1 may include determining that a subsequent command from the thread has been received at the hardware acceleration block prior to completion of processing of a previous command of the thread. The hardware acceleration block adds an indication indicating an occurrence of a timing violation, in a response for the thread.

In example 4, the subject matter of example 1 may include that the dedicated pair of registers comprise a submission register and a completion register, wherein the successive commands comprise a first command and a second command, and wherein the first command is received from the thread at the submission register and a state indicator is set to indicate a busy state. The first command is processed, and a response is indicated in the completion register for the thread to read. In response to a reading of the completion register, the state indicator is set to indicate a not busy state.

In example 5, the subject matter of example 4 may include that the plurality of threads avoid reading the state indicator.

In example 6, the subject matter of example 4 may include that the compute complex avoids operations to maintain any queues of the plurality of threads to access the hardware acceleration block.

In example 7, the subject matter of example 1 may include that the thread waits or performs other operations at least for the amount of time before sending the successive commands to the hardware acceleration block.

In example 8, the subject matter of example 1 may include that the hardware acceleration block and the compute complex comprise an embedded system.

In example 9, the subject matter of example 1 may include that the hardware acceleration block and the compute complex comprise a solid state drive, wherein the hardware acceleration block performs read, write, and error correction operations on non-volatile memory of the solid state drive.

Example 10 is a system for command processing, wherein the system comprises a a compute complex, and a hardware acceleration block coupled to the compute complex, wherein the system is operable to: configure the hardware acceleration block to process via a dedicated pair of registers, a plurality of commands of each of a plurality of threads received from the compute complex; and receive, by the hardware acceleration block, successive commands that are separated by at least an amount of time, from a thread of the plurality of threads, wherein the amount of time is adequate to process a command from the thread.

In example 11, the subject matter of example 10 may include generating by the hardware acceleration block, an interrupt indicating a fault, in response to a subsequent command from the thread being received at the hardware acceleration block prior to completion of processing of a previous command of the thread.

In example 12, the subject matter of example 10 may include that the system is further operable to: determine that a subsequent command from the thread has been received at the hardware acceleration block prior to completion of processing of a previous command of the thread; and, add, by the hardware acceleration block, an indication indicating an occurrence of a timing violation, in a response for the thread.

In example 13, the subject matter of example 10 may include that the dedicated pair of registers comprise a submission register and a completion register, wherein the successive commands comprise a first command and a second command, and wherein the system is further operable to: receive, the first command from the thread at the submission register and setting a state indicator to indicate a busy state; process the first command; indicate a response in the completion register for the thread to read; and in response to a reading of the completion register, set the state indicator to indicate a not busy state.

In example 14, the subject matter of example 10 may include that the plurality of threads avoid reading the state indicator.

In example 15, the subject matter of example 13 may include that the compute complex avoids operations to maintain any queues of the plurality of threads to access the hardware acceleration block.

In example 16, the subject matter of example 10 may include that the thread waits or performs other operations at least for the amount of time before sending of the successive commands to the hardware acceleration block.

In example 17, the subject matter of example 10 may include that the hardware acceleration block and the compute complex comprise an embedded system.

In example 18, the subject matter of example 10 may include that the hardware acceleration block and the compute complex comprise a solid state drive, wherein the hardware acceleration block performs read, write, and error correction operations on non-volatile memory of the solid state drive.

In example 19, the subject matter of example 18 may include that the non-volatile memory comprises at least one of block addressable memory, byte addressable memory, NAND based memory, NOR based memory, three dimensional (3D) cross-point memory, write-in-place nonvolatile memory, chalcogenide glass based memory, multi-threshold level NAND flash memory, NOR flash memory, phase change memory (PCM), resistive memory, nanowire memory, ferroelectric transistor random access memory (FeTRAM), magnetoresistive random access memory (MRAM) memory, spin transfer torque (STT)-MRAM, and spintronic magnetic junction memory.

Example 20 is a hardware acceleration block for command processing, the hardware acceleration block comprising: an application specific integrated circuit (ASIC); and a dedicated pair of registers, wherein the hardware acceleration block is operable to: process via the dedicated pair of registers, a plurality of commands of each of a plurality of threads received from a compute complex; and receive successive commands that are separated by at least an amount of time, from a thread of the plurality of threads, wherein the amount of time is adequate to process a command from the thread.

In example 21, the subject matter of example 20 may include that the hardware acceleration block is further operable to generate an interrupt to indicate a fault, in response to a subsequent command from the thread being received at the hardware acceleration block prior to completion of processing of a previous command of the thread.

In example 22, the subject matter of example 20 may include that the hardware acceleration block is further operable to: determine that a subsequent command from the thread has been received at the hardware acceleration block prior to completion of processing of a previous command of the thread; and add an indication indicating an occurrence of a timing violation, in a response for the thread.

In example 23, the subject matter of example 20 may include that the dedicated pair of registers comprise a submission register and a completion register, wherein the successive commands comprise a first command and a second command, and wherein the hardware acceleration block is further operable to: receive, the first command from the thread at the submission register and setting a state indicator to indicate a busy state; process the first command; indicate a response in the completion register for the thread to read; and in response to a reading of the completion register, set the state indicator to indicate a not busy state.

Example 24 is a computational device for command processing, the computational device comprising: a processor; a display communicatively coupled to the processor; a network interface communicatively coupled to the processor; and an embedded system communicatively coupled to the processor, the embedded system comprising: a compute complex; and a hardware acceleration block coupled to the compute complex, wherein the embedded system is operable to: configure the hardware acceleration block to process via a dedicated pair of registers, a plurality of commands of each of a plurality of threads received from the compute complex; and receive, by the hardware acceleration block, successive commands that are separated by at least an amount of time, from a thread of the plurality of threads, wherein the amount of time is adequate to process a command from the thread.

In example 25, the subject matter of example 24 may include that the embedded system is further operable to generate, by the hardware acceleration block, an interrupt to indicate a fault, in response to a subsequent command from the thread being received at the hardware acceleration block prior to completion of processing of a previous command of the thread.

Example 26 is a system for command processing comprising means for configuring a hardware acceleration block to process via a dedicated pair of registers, a plurality of commands of each of a plurality of threads received from a compute complex; and means for receiving, by the hardware acceleration block, successive commands that are separated by at least an amount of time, from a thread of the plurality of threads, wherein the amount of time is adequate to process a command from the thread.

All optional features of any of the systems and/or apparatus and/or devices described above may also be implemented with respect to the method or process described above, and specifics in the examples may be used anywhere in one or more embodiments. Additionally, all optional features of the method or process described above may also be implemented with respect to any of the system and/or apparatus and/or devices described above, and specifics in the examples may be used anywhere in one or more embodiments.

What is claimed is:

1. A method, comprising:
    configuring a hardware acceleration block to process via a dedicated pair of registers, a plurality of commands of each of a plurality of threads received from a compute complex; and
    receiving, by the hardware acceleration block, successive commands that are separated by at least an amount of time, from a thread of the plurality of threads, wherein the amount of time is adequate to process a command from the thread.

2. The method of claim 1, the method further comprising:
    generating an interrupt indicating a fault, in response to a subsequent command from the thread being received at the hardware acceleration block prior to completion of processing of a previous command of the thread.

3. The method of claim 1, the method further comprising:
    determining that a subsequent command from the thread has been received at the hardware acceleration block prior to completion of processing of a previous command of the thread; and
    adding, by the hardware acceleration block, an indication indicating an occurrence of a timing violation, in a response for the thread.

4. The method of claim 1, wherein the dedicated pair of registers comprise a submission register and a completion register, wherein the successive commands comprise a first command and a second command, and wherein the method further comprises:
    receiving, the first command from the thread at the submission register and setting a state indicator to indicate a busy state;
    processing the first command;
    indicating a response in the completion register for the thread to read; and
    in response to a reading of the completion register, setting the state indicator to indicate a not busy state.

5. The method of claim 4, wherein the plurality of threads avoid reading the state indicator.

6. The method of claim 4, wherein the compute complex avoids operations to maintain any queues of the plurality of threads to access the hardware acceleration block.

7. The method of claim 1, wherein the thread waits or performs other operations at least for the amount of time before sending the successive commands to the hardware acceleration block.

8. The method of claim 1, wherein the hardware acceleration block and the compute complex comprise an embedded system.

9. The method of claim 1, wherein the hardware acceleration block and the compute complex comprise a solid state drive, and wherein the hardware acceleration block performs read, write, and error correction operations on non-volatile memory of the solid state drive.

10. A system, comprising:
    a compute complex; and
    a hardware acceleration block coupled to the compute complex, wherein the system is operable to:
        configure the hardware acceleration block to process via a dedicated pair of registers, a plurality of commands of each of a plurality of threads received from the compute complex; and
        receive, by the hardware acceleration block, successive commands that are separated by at least an amount of time, from a thread of the plurality of threads, wherein the amount of time is adequate to process a command from the thread.

11. The system of claim 10, wherein the system is further operable to:
    generate, by the hardware acceleration block, an interrupt to indicate a fault, in response to a subsequent command from the thread being received at the hardware acceleration block prior to completion of processing of a previous command of the thread.

12. The system of claim 10, wherein the system is further operable to:
    determine that a subsequent command from the thread has been received at the hardware acceleration block prior to completion of processing of a previous command of the thread; and
    add, by the hardware acceleration block, an indication indicating an occurrence of a timing violation, in a response for the thread.

13. The system of claim 10, wherein the dedicated pair of registers comprise a submission register and a completion register, wherein the successive commands comprise a first command and a second command, and wherein the system is further operable to:
    receive, the first command from the thread at the submission register and setting a state indicator to indicate a busy state;
    process the first command;
    indicate a response in the completion register for the thread to read; and
    in response to a reading of the completion register, set the state indicator to indicate a not busy state.

14. The system of claim 13, wherein the plurality of threads avoid reading the state indicator.

15. The system of claim 13, wherein the compute complex avoids operations to maintain any queues of the plurality of threads to access the hardware acceleration block.

16. The system of claim 10, wherein the thread waits or performs other operations at least for the amount of time before sending of the successive commands to the hardware acceleration block.

17. The system of claim 10, wherein the hardware acceleration block and the compute complex comprise an embedded system.

18. The system of claim 10, wherein the hardware acceleration block and the compute complex comprise a solid state drive, and wherein the hardware acceleration block performs read, write, and error correction operations on non-volatile memory of the solid state drive.

19. The system of claim 18, wherein the non-volatile memory comprises at least one of block addressable memory, byte addressable memory, NAND based memory, NOR based memory, three dimensional (3D) cross-point memory, write-in-place nonvolatile memory, chalcogenide glass based memory, multi-threshold level NAND flash memory, NOR flash memory, phase change memory (PCM), resistive memory, nanowire memory, ferroelectric transistor random access memory (FeTRAM), magnetoresistive random access memory (MRAM) memory, spin transfer torque (STT)-MRAM, and spintronic magnetic junction memory.

20. A hardware acceleration block, comprising:
   an application specific integrated circuit (ASIC); and
   a dedicated pair of registers, wherein the hardware acceleration block is operable to:
      process via the dedicated pair of registers, a plurality of commands of each of a plurality of threads received from a compute complex; and
      receive successive commands that are separated by at least an amount of time, from a thread of the plurality of threads, wherein the amount of time is adequate to process a command from the thread.

21. The hardware acceleration block of claim 20, wherein the hardware acceleration block is further operable to:
   generate an interrupt to indicate a fault, in response to a subsequent command from the thread being received at the hardware acceleration block prior to completion of processing of a previous command of the thread.

22. The hardware acceleration block of claim 20, wherein the hardware acceleration block is further operable to:
   determine that a subsequent command from the thread has been received at the hardware acceleration block prior to completion of processing of a previous command of the thread; and
   add an indication indicating an occurrence of a timing violation, in a response for the thread.

23. The hardware acceleration block of claim 20, wherein the dedicated pair of registers comprise a submission register and a completion register, wherein the successive commands comprise a first command and a second command, and wherein the hardware acceleration block is further operable to:
   receive, the first command from the thread at the submission register and setting a state indicator to indicate a busy state;
   process the first command;
   indicate a response in the completion register for the thread to read; and
   in response to a reading of the completion register, set the state indicator to indicate a not busy state.

24. A computational device, comprising:
   a processor;
   a display communicatively coupled to the processor;
   a network interface communicatively coupled to the processor; and
   an embedded system communicatively coupled to the processor, the embedded system comprising:
      a compute complex; and
      a hardware acceleration block coupled to the compute complex, wherein the embedded system is operable to:
         configure the hardware acceleration block to process via a dedicated pair of registers, a plurality of commands of each of a plurality of threads received from the compute complex; and
         receive, by the hardware acceleration block, successive commands that are separated by at least an amount of time, from a thread of the plurality of threads, wherein the amount of time is adequate to process a command from the thread.

25. The computational device of claim 24, wherein the embedded system is further operable to:
   generate, by the hardware acceleration block, an interrupt to indicate a fault, in response to a subsequent command from the thread being received at the hardware acceleration block prior to completion of processing of a previous command of the thread.

* * * * *